Feb. 27, 1940.　　　W. I. WEEKS　　　2,192,021
AUTOMATIC BRAKING SYSTEM
Filed Jan. 24, 1939　　　4 Sheets-Sheet 1

Fig. 1

INVENTOR.
WARREN I. WEEKS
BY
Richards & Geier
ATTORNEYS

Feb. 27, 1940.  W. I. WEEKS  2,192,021
AUTOMATIC BRAKING SYSTEM
Filed Jan. 24, 1939   4 Sheets-Sheet 4

INVENTOR.
WARREN I. WEEKS
BY
Richards & Geier
ATTORNEYS

Patented Feb. 27, 1940

2,192,021

UNITED STATES PATENT OFFICE 2,192,021

AUTOMATIC BRAKING SYSTEM

Warren I. Weeks, Ventnor, N. J.

Application January 24, 1939, Serial No. 252,541

14 Claims. (Cl. 188—110)

My invention relates to automatic operating mechanism for setting the brakes of an automobile in the event an operator of the vehicle should become unconscious through any cause or should fall asleep causing him to release his grip on the steering wheel breaking the contacts of a switch therein and automatically setting the brakes of the vehicle.

In the past, automatic braking systems with which I am familiar, were not fully practical since upon the release of the operator's grasp from the steering wheel, power was applied to the braking system, the intensity of the same not being automatically governed in relation to the speed at which the vehicle was travelling. The engine was stopped when the brakes were applied regardless of whether the stop was an unconscious or conscious one.

Other automatic braking systems were not designed to be connected or disconnected from the conventional braking system of a vehicle quickly and simply. No means in these prior systems were provided to lock the brakes after the setting thereof and upon the stopping of the engine of the vehicle.

It is, therefore, among the objects of my invention to provide a mechanism whereby the vehicle is automatically brought to a stop when the operator releases his grip from the steering wheel.

It is another object of my invention to provide an automatic braking system for a motor vehicle wherein the intensity of the braking is automatically controlled to provide the proper amount of braking power at high and low speeds of the vehicle.

Another object of my invention is to provide means whereby the maximum amount of braking power is applied to the brakes of the vehicle after the brakes are set automatically or by foot when the ignition of the vehicle is cut and the engines stopped.

A still further object of my invention is to provide means to manually control the intensity of the braking power in order that the proper amount of power may be applied to the brakes when a vehicle is loaded or when the vehicle is empty.

Another object of this invention is to provide vacuum controlled locking means to lock the brakes, so that the same cannot easily be released after the same are applied without starting the engine of the vehicle.

It is still a further object of my invention to provide an automatic brake operating mechanism for a motor vehicle which may be easily attached to the braking system of vehicles already in use as well as new vehicles regardless of type of brake system.

A further object of this invention is to provide an automatic braking system which does not interfere with the conventional operation of the brakes of a motor vehicle by means of the conventional foot brake pedal.

It is a further object of my invention to provide for the automatic cut-out of the ignition circuit of the automobile upon the release of the operator's grip from the steering wheel. Means, however, are also provided whereby the automatic ignition cut-out means may be manually disconnected from the remainder of the automatic braking system without affecting the operation of the system.

It is still a further object of my invention to provide means whereby the operator of a motor vehicle may consciously apply the brakes of the vehicle through the automatic braking system of my invention without cutting out the ignition to the engine.

Other objects will be obvious or will appear during the course of the following specification.

In accomplishing the above objects, it has been found most satisfactory, according to this embodiment of the invention, to provide an electrically controlled valve having three ports, two of which are connected to two vacuum intensity valves, one of said valves set at a fixed position governing the vacuum to be admitted to the power brake cylinder through the third port to a second electrically controlled valve in accordance with the speed of the vehicle. The other vacuum intensity valve, which is adjustable manually from the driving compartment of the vehicle, is adapted to admit vacuum of the proper intensity to the power brake cylinder, through the second electrically controlled valve, in accordance with whether or not the vehicle is loaded or empty.

The first-mentioned electrically controlled valve is controlled by an electrical governor which is set to become inoperative above a certain fixed speed which sets the first-mentioned electrically controlled valve in a position to admit vacuum, through the vacuum intensity valve which is manually controlled from the driving compartment in accordance with whether or not the vehicle is empty or loaded, to the second-mentioned electrically controlled valve.

When the vehicle is being operated at a speed at or less than that to which the electrical governor is set, the electrical governor is in an operative position and the first-mentioned electrically controlled valve is set to admit vacuum to the second-mentioned electrically controlled valve through the vacuum intensity valve which is set at a fixed position. This fixed position is set in relation to the speed at which the electrical governor is set to operate, so that while said governor is in an operative position the proper amount of vacuum is passed through the intensity valve to stop the vehicle smoothly at or below the speed at which the governor is set to operate.

The second-mentioned electrically controlled valve is controlled through the switch mechanism in the steering wheel so that vacuum will be admitted to the power brake cylinder upon the release of the operator's grip from the steering wheel. The intensity of the vacuum admitted to the power brake cylinder is, of course, governed by whether or not the electrical governor is operative or inoperative.

A vacuum controlled locking device to act upon the power brake shaft is connected to the intake manifold of the engine so that the same will lock said shaft locking the brakes after the same have been applied and the vacuum in the engine stopped by the engine being cut off.

Means are also provided which are operated by movement of the power brake shaft by the cylinder so as to disconnect a switch which cuts out the ignition of the automobile stopping the engine. This means is so connected to the clutch pedal through a flexible connection that upon depressing the clutch this switch becomes inoperative and the engine is not stopped by applying the brakes through the automatic system. A switch is also provided to manually disconnect the ignition cut-out switch in the event it is not desired to use the same in the automatic system.

Connections between the brake pedal and the master hydraulic cylinder for applying the brakes are provided whereby the brakes of the vehicle may be applied by foot. Means cooperating with the foot brake pedal are provided to operate a switch which renders the automatic braking system inoperative when the vehicle brakes are applied in the conventional manner.

Switch means are also provided, as well as a valve in the main vacuum line leading to the intake manifold of the engine, whereby the automatic system may be disconnected from the conventional braking system when it is not desired to use said automatic system.

In the drawings is shown one of the various possible embodiments to which the invention is by no means restricted, the drawings being merely by way of illustration and not by way of limitation.

Like numerals refer to like parts throughout the several views.

Figure 1:
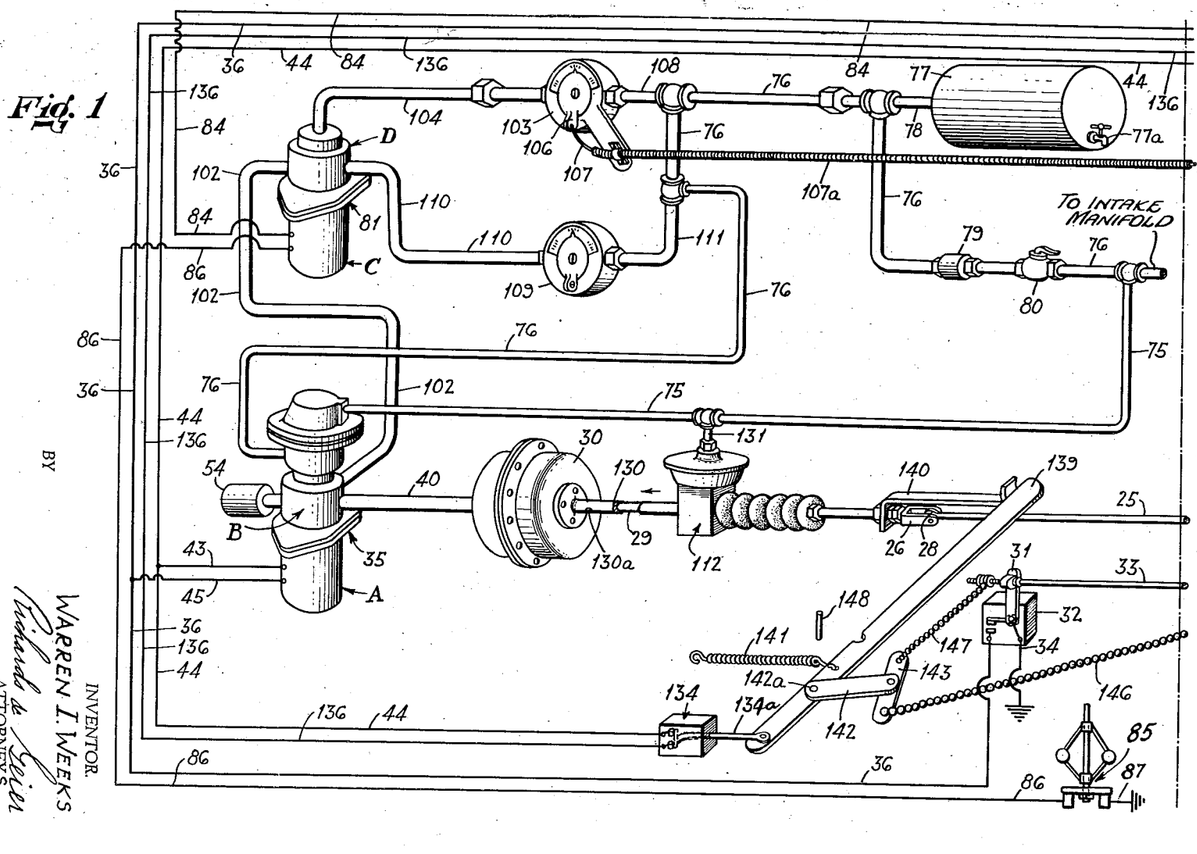
Figures 1 and 1a are a schematic illustration of my automatic control system as applied to the operating mechanism of a hydraulic braking system.
Figure 1A:
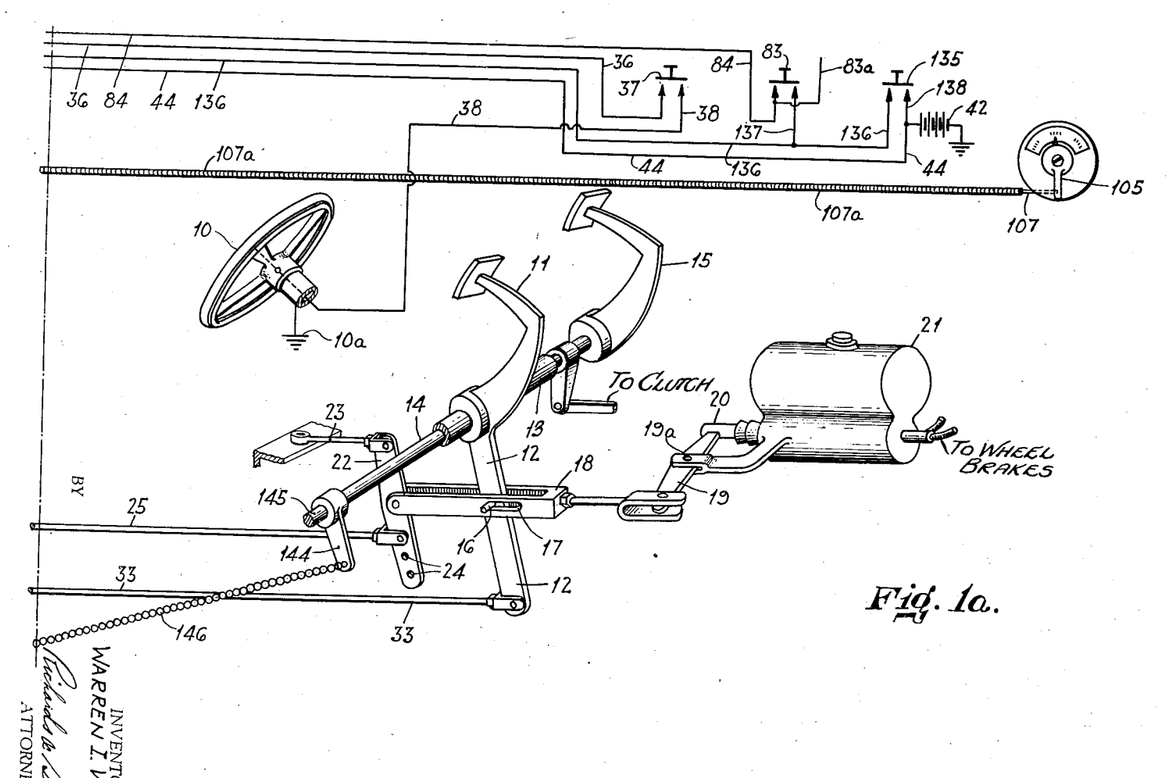

In Figures 1 and 1a of the drawings is shown my invention as applied to a conventional hydraulic braking system. In Figure 1a is shown a steering wheel 10 which has therein electrical switch means preferably of the type shown and described in my co-pending application Serial Number 137,942, filed April 20, 1937, for Automatic safety operating mechanism for automobile brakes. A brake pedal 11 having an extension 12 is fixedly mounted on a hollow shaft 13. Rotatably mounted within the shaft 13 is a shaft 14 upon which is fixedly mounted a clutch pedal 15.

A pin 16 is mounted on the extension 12 and projects through a slot 17 in a clevis 18, one end of which is pivotally connected to a lever 19 which is, in turn, pivotally mounted at 19a and connected to a piston rod 20 on a piston in the hydraulic master cylinder 21.

The other end of the clevis 18 is pivotally connected to an arm 22 one end of which is, in turn, pivotally connected to a mounting 23 anchored to the frame (not shown) of a vehicle. The arm 22 has a plurality of apertures 24, to provide an adjustment for the connecting rod 25 in order to increase or decrease the braking power by changing the leverage thereof.

The connecting rod 25 is connected to a clevis 26 by means of a pin 28 extending through the clevis. The clevis 26 is fastened to the power brake shaft 29 which is, in turn, connected to a piston in a vacuum cylinder 30. The vacuum cylinder 30 is a part of my automatic braking system which is hereinafter described.

The extension 12 of the brake pedal 11 is connected to a movable arm 31 attached to the movable contact of a switch 32 through a connecting rod 33. One contact of said switch is connected to the ground through the lead 34 and the other contact is connected to one contact of a main control valve 35 also a part of my automatic braking system, which will be hereinafter fully described, and to one contact of the switch in the steering wheel 10 through the lead 36, steering wheel cut-out switch 37 and lead 38. The contacts in the steering wheel switch are normally spaced apart.

When it is desired to use the foot brake in a conventional manner, apart from the automotive braking system, pressure is applied to the brake pedal 11 which rocks the extension 12 which, through the pin 16 bearing on one end of the slot 17 in the clevis 18, causing the clevis to move to the left which, in turn, moves the lever 19 to pivot at 19a and move the piston in the master hydraulic cylinder 21. Movement of the piston in the master cylinder 21 inwardly applies pressure to the hydraulic system, which pressure is effective to apply the brakes on the individual wheels of a vehicle. Rocking of the extension 12 will also move the connecting rod 33 which will make a contact between the two controls in the switch 32 rendering the automatic system inoperative as will be hereinafter described.

Supplementing this hydraulic foot operated braking system I provide an automatic operator which is effective upon release of the operator's grip from the steering wheel.

This automatic system comprises the vacuum cylinder 30 which is connected to a main control valve 35 through a pipe line 40. The main control valve 35, as shown more particularly in Figures 2 and 3, consists of two sections, A a solenoid and B the valve proper. The solenoid section A houses the solenoid coil 41 one end of which is connected to one pole of a battery 42, the other pole thereof being grounded, through the leads 43 and 44. The other end of the solenoid coil 41 is connected to the opposite pole of the electrical source through the leads 45, 36, steering wheel cut-out switch 37, lead 38 and the switch in the steering wheel 10, one contact of which is grounded at 10a.

The section B of the main control valve 35 consists of a body portion 35a having a recess 46 in the top central portion thereof. The recess 46 is screw threaded to accommodate a plug 47 which divides said recess into a top chamber 48 and bottom chamber 49. The chamber 48 has an opening 50 therein and the chamber 49 has an opening 51, as shown more particularly in Figure 3.

Figure 2:
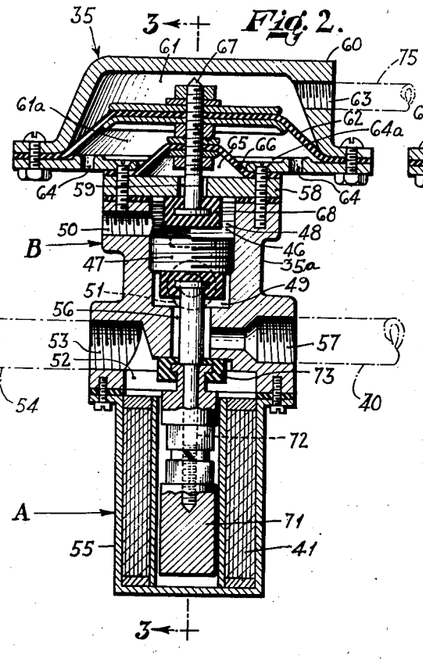
Figure 2 is a vertical cross-sectional view of the main vacuum control valve used in conjunction with the vacuum power cylinder.

The bottom of the body portion 35a has a recess 52 therein which has an opening 53 connected to an air cleaner 54. The solenoid coil 41 is mounted in a casing 55 which, in turn is mounted on the bottom of the body portion 35a in such a manner as to make the recess 52 air tight. The chamber 49 and the recess 52 are connected by means of a passage 56. The passage 56 has an opening 57 therein.

Figure 3:
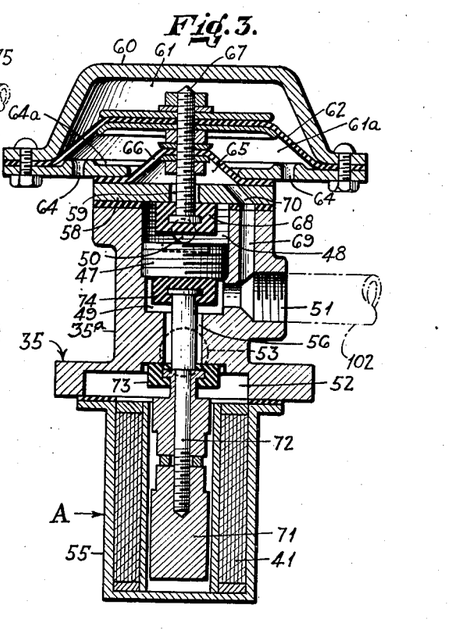
Figure 3 is a cross-sectional view taken on the line 3—3 of Figure 2.

The recess 46 is closed at the top by a plate 58 having a passage 59. A vacuum head 60 is mounted on top of the plate 58 said head having a chamber 61 in which is mounted a flexible diaphragm 62. The top portion of the chamber 61 has an opening 63 and the bottom portion 61a has a gutter 64a extending around the surface of the bottom in which there is a plurality of exhaust apertures 64 therein. The gutter 64a acts as a drain for any oil which may enter the exhaust apertures, so that said oil will not come in contact with the diaphragms 62 and 66 and disintegrate the same. The top portion of the chamber 61 and the bottom portion 61a are in airtight relation to one another. A second air tight chamber 65 is formed by a flexible diaphragm 66. The flexible diaphragms 62 and 66 are connected by means of a rod 67 which extends through the passage 59 in the plate 58 and has a valve 68 which cooperates with the passage 59 to open and close the same as is hereinafter described. The chamber 65 is connected with the opening 51 in the body portion 35a by means of a passage 69 in said body portion, as shown in Figure 3, which communicates with a passage 70 in the plate 58.

The armature 71 of the solenoid 41 is connected to a valve stem 72 which extends through the passage 56. A valve 73 is mounted on said stem to open and close communication between the passage 56 and the recess 52. Another valve 74 is mounted on the valve stem to close communication between the passage 56 and chamber 49 when communication between said passage and the recess 52 is open and to open communication between the passage 56 and chamber 49 when the communication between passage 56 and recess 52 is closed. Movement of the armature 71 as the solenoid 41 is energized and de-energized controls the opening and closing of the valves 73 and 74.

(See Figures 1 and 1a.) The opening 63 of the chamber 61 is connected to the intake manifold of an internal combustion engine by the pipe line 75. The opening 50 of the chamber 48 is also connected to the intake manifold by means of the pipe line 76. An auxiliary reservoir 77 is connected into said line by means of a pipe 78. The auxiliary reservoir 77 has a petcock 77a therein in order that the vacuum in the system may be released therethrough. Interposed between said auxiliary reservoir and said intake manifold is a check valve 79 so that in the event the automobile engine is stopped the source of vacuum supply in the reservoir 77 will not be lost. A valve 80 is interposed in the line 76 between the check valve 79 and the intake manifold in order that the automatic system may be cut off by turning the valve 80 to the off position, turning the petcock 77a to an open position, and turning the switch 37, so that the contacts therein are broken and the switch in the steering wheel 10 made inoperative.

I also provide means in the automatic braking mechanism of my invention whereby the intensity of the braking power may be increased automatically at a speed in excess of a predetermined speed and whereby the braking intensity might also be increased or decreased manually in accordance with the load carried by the vehicle.

Figure 4:
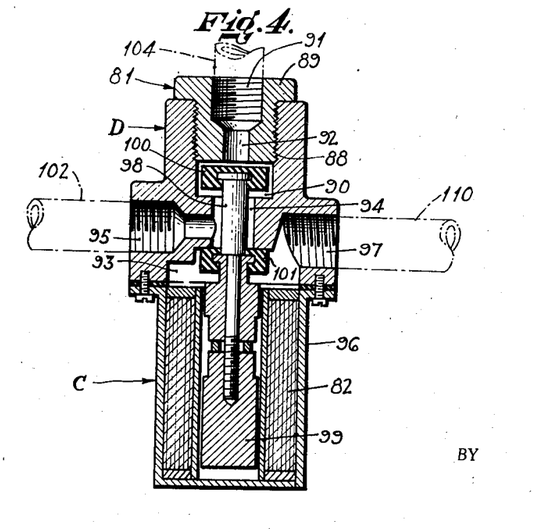
Figure 4 is a vertical cross-sectional view of the secondary vacuum control valve used in my automatic control system.

(See Figure 4.) Such a means consists of a secondary control valve 81, which comprises two sections, C a solenoid and D the valve proper. The solenoid section C houses a solenoid coil 82 one end of which is connected to the secondary side of a conventional ignition switch 83 through the lead 84, so that there will be no loss of current when the ignition switch is open. The other end of said solenoid coil 82 is connected to one contact of an electrical governor 85 by means of the lead 86.

The electrical governor 85 is of the conventional type and is set so that the contacts therein will snap apart or break at a fixed predetermined speed. For example, the governor which I use in the embodiment of my invention, shown in the drawings, is set so that the contacts therein will remain together at or below a speed of 18 miles per hour. At any speed over 18 miles per hour, the contacts therein will snap apart and remain open. The other contact of the electrical governor 85 is connected to the ground through the lead 87. (See Figure 1.)

(See Figure 4.) The section D of the secondary control valve 81 consists of a body portion having a recess 88 in the top thereof which is screw threaded to accommodate a plug 89 which, when screwed into the recess 88, forms a chamber 90 therein. The plug 89 has a threaded opening 91 therein which communicates with the chamber 90 through a passage 92. In the bottom portion of said secondary valve is formed a recess 93 which communicates with the chamber 90 through a passage 94. The passage 94 has an opening 95 therein.

The solenoid coil 82, which is mounted in a housing 96, is mounted on the bottom of the section D closing the recess 93 and making the same air tight. The recess 93 has a screw threaded opening 97 therein.

A valve stem 98 is fastened to an armature 99 in the solenoid coil 82 which valve stem extends through the passage 94. A valve 100 is mounted on the end of the valve stem 98 and is adapted to open and close communication between the passage 94 and the chamber 90. A valve 101 is also mounted on the valve stem 98 to open and close the communication between the passage 94 and the recess 93. The valves 100 and 101 are so mounted on the valve stem 98 that, when the solenoid 82 is de-energized, the communication between the chamber 90 and the passage 94 is open and the communication between the passage 94 and the recess 93 is closed. When the solenoid 82 is energized the communication between the chamber 90 and the passage 94 is closed and the communication between the passage 94 and the recess 93 is open.

(See Figures 1 and 1a.) The secondary control valve 81 is connected to the main control valve 35 by means of a pipe line 102 which is connected to the opening 95 in the secondary control valve 81 and the opening 51 in the main control valve 35. The opening 91 in the control valve 81 is connected to a vacuum intensity control valve 103 through the pipe line 104. The vacuum intensity control valve 103 is adapted to be operated from a control lever 105 in the driver's compartment of a vehicle and is connected to said lever through the lever 106 on said valve by means of a cable 107 in a conduit 107a. The valve 103 is connected to the intake manifold of the engine through the pipe line 108, 76, and the check valve 79 and valve 80. The valves 79 and 80 are interposed between the intake manifold and the vacuum intensity control valve.

The auxiliary reservoir 77 is interposed in the line 76 between said check valve and the load control valve 103.

The valve 103 is to regulate manually the intensity of the braking power, so that with an empty vehicle the operator will have sufficient braking power to make a satisfactory stop, and so that with a loaded vehicle there will be increased braking power. The valve 103 is graduated from a minimum to a maximum braking power and controls the braking power in the automatic system of my invention when the speed of the vehicle is above the predetermined speed fixed by the governor 85.

The opening 97 in the secondary control valve 81 is connected to a secondary vacuum intensity control valve 109 through a pipe line 110, which valve 109 is, in turn, connected through the pipe line 111 to the line 76.

The secondary vacuum intensity control valve 109 is set at a predetermined position in order that the proper amount of braking power below a certain speed, which is governed by the governor 85, is accomplished.

In order that the brakes of the vehicle may be locked after being applied, and after the ignition circuit is closed, shutting off the motor of the vehicle, and the suction from the intake manifold is stopped, I provide a vacuum locking device 112 which acts upon the power brake shaft 29.

Figure 5:
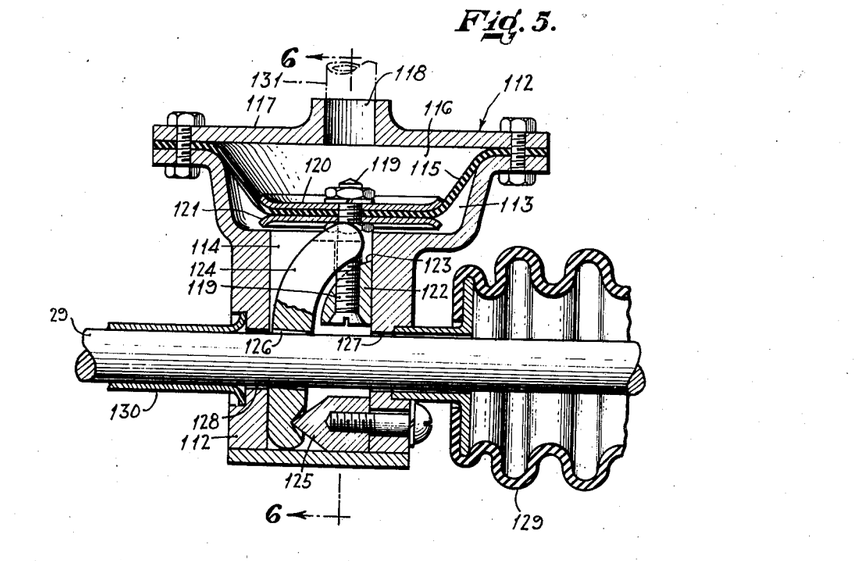
Figure 5 is a cross-sectional view of my vacuum controlled locking device which acts on the power brake shaft.
Figure 6:
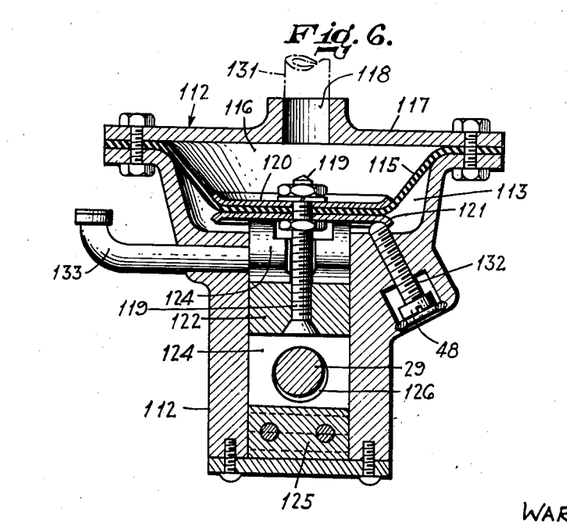
Figure 6 is a cross-sectional view taken on the line 6—6 of Figure 5.

(See Figures 5 and 6.) The locking device 112, as shown more particularly in Figures 5 and 6, consists of a main body portion having a recess 113 formed in the top thereof and a recess 114 extending through the central portion thereof. A flexible diaphragm 115 is mounted in the recess 113 forming a chamber 116 and is held in position by a plate 117 which is fastened to the body portion of the locking device 112 making the chamber 116 air tight. The plate 117 has an opening 118 therein which communicates with the chamber 116.

Fastened to the flexible diaphragm 115 by means of a bolt 119 which cooperates with two reinforcing plates 120 and 121 on said diaphragm is a cam 122 having a curved surface 123 which is adapted to be reciprocated vertically within the recess 114. The curved surface 123 of the cam 122 is adapted to engage a rocker arm 124 which is adapted to rock on a fulcrum bar 125 in the recess 114.

The rocker arm 124 has a hole 126 passing therethrough which is of a slightly greater diameter than the power brake shaft 29 which passes through holes 127 and 128 on opposite sides of the recess 114 and through the hole 126 in the rocker arm. A boot 129 around the shaft 29 prevents dirt from entering the locking device on one side of the same while a covering 130 serves a like purpose on the other side. The covering 130 also serves to anchor the locking device to the power cylinder 30. An opening 130a is positioned on the bottom of the covering 130 closely adjacent the power cylinder 30 to prevent oil from the locking device 112 entering the power cylinder.

The opening 118 is connected to the intake manifold of an automobile engine through the pipe line 131 which connects to the line 75.

When the motor is not running the locking device will be in the position shown in Figures 5 and 6 with the diagonally opposite edges of the hole 126 in the rocking arm 124 wedged against the power shaft 29, preventing movement thereof to the right. When the engine is started and the diaphragm 120 moves upwardly through the vacuum created in the chamber 116, the curved surface 123 on the cam 122, which is fastened to the diaphragm, engages the rocker arm 124 rocking the same on the fulcrum bar 125 so that the diagonally opposite edges of the hole 126 will disengage the shaft 29 and allow movement of the shaft 29 to the right in order that the brakes might be released. A lubricating tube 133 is provided for lubricating the interior of the locking device.

If, for any reason, the engine should fail and it is necessary to tow the vehicle, since the locking device 112 is engaged with the shaft 29 preventing movement of the same, it is necessary to provide means for releasing the locking device. I, therefore, provide a screw 132 in the locking device 112, which acts on the reinforcing plate 121 of the diaphragm 115. By turning the screw inwardly the diaphragm 115 is lifted which will disengage the diagonally opposite edges of the hole 126 from the shaft 29 placing the locking device 112 in an inactive position, so that the brakes can be operated.

When the engine is stopped and the locking device 112 is engaged with the shaft 29, the brakes cannot be released accidentally, such as by children playing in the driver's compartment, since the engine must be started to release the locking device, or the screw 48 which is inaccessible from the driver's compartment must be turned to release the locking device.

It is desirable, when the car comes to an emergency stop by means of the operation of the automatic braking device of my invention through the releasing of the grasp of the operator on the steering wheel 10, for example, by the operator lapsing into unconsciousness, to cut the ignition to the motor, so that the motor will not be left running.

(See Figures 1 and 1a.) This I accomplish by means of a switch 134 which has two fixed contacts one of which is connected to one pole of the battery 42 by means of the lead 44 and the other of which is connected to a normally open cut-out switch 135 by means of the lead 136. The ignition of the vehicle is normally connected to the battery 42 through a lead 83a, the conventional ignition switch 83, leads 137 and 136, and switch 134 and the lead 44.

The movable contact in switch 134 is connected to a rod 134a, the fixed contacts being normally closed by the movable contact. The rod 134a is adapted to reciprocate horizontally and is pivoted to a lever 139. An arm 140 fastened to shaft 29 is adapted to engage the lever 139 against the tension of the spring 141 which is anchored to the frame of the vehicle, so that when there is no vacuum in the power cylinder 30 and the shaft 29 is positioned at the full extent of its movement to the right, the movable contact in the switch 134 engages the two fixed contacts.

On the lever 139 closely adjacent the switch 134 is pivotally mounted a lever 142, the lever 142 having a cross-arm 143 pivotally mounted thereon. One end of the cross arm 143 is fastened to a crank 144 on the clutch pedal shaft 145 by means of a flexible connection 146. The other end of the cross arm 143 is fastened by means of a flexible connection 147 to the rod 33, which is fastened to the arm 31 connected to the movable contact of the switch 32.

When the brakes are applied during an emergency stop through the automatic system of my invention the power shaft 29 moves to the left, as shown in Figure 1, moving the arm 140 to the left also. The lever 139, through the tension in the spring 141, is kept in engagement with the arm 140. The arm 142 is held in position, however, through the cross-arm 143 and the flexible connections 146 and 147. When the lever 139 engages a stop 148, which is anchored to the frame of the vehicle, the lever 139 pivots on the stop 148 moving the rod 134a, to which the movable contact in the switch 134 is fastened, to the right, in Figure 1, breaking the contact between the fixed contacts in said switch and thereby cutting off the ignition to the engine.

When a conscious, as distinguished from an emergency stop is made, the clutch pedal is depressed, so that the crank 144 will move to the left, Figure 1a, moving the flexible connection 146 to the left, which allows the lever 142 to move to the left with the arm 139 which is in engagement with the shaft 29 through the arm 140. When the brakes of the vehicle are applied the shaft 29 moves to the left, the lever 139 moving with it under tension of the spring 141, the lever 139 pivoting on the pivotal connection between itself and the rod 134a. In this manner, the connection between the ignition of the vehicle and the battery 42 through the lead 44, switch 134, leads 136 and 137, ignition switch 83 and lead 83a is not interrupted since the contacts in the switch 134 are not broken. The engine of the vehicle, therefore, is not stopped.

(See Figures 1 and 1a.) In using the automatic braking system of my invention in conjunction with the braking system of a motor vehicle to which this system is attached, the cut-out switch 37 is closed which connects one contact of the switch in the steering wheel 10 to one end of the solenoid coil 41 of the main control valve 35 through the lead 38, switch 37, lead 36, and lead 45 and also to one contact of the normally open switch 32 which is operated to be closed by the foot brake pedal 11. The other contact of the switch in the steering wheel 10 is connected to the ground, as is the other fixed contact of the switch 32. The conventional ignition switch 83 is also closed which connects one end of the solenoid coil 82 in the secondary control valve to the battery 42 through the lead 84, switch 83, lead 137, lead 136, the normally closed switch 134, and lead 44. The other end of the solenoid coil 41 of the main control valve 35 is also connected to the battery 42 through the lead 44 and lead 43.

The other end of the solenoid coil 82 of the secondary control valve 81 is connected to the governor 85, which is normally closed until a predetermined fixed speed is reached by the vehicle, through the lead 86. The other connection to the governor 85 is grounded through the lead 87.

When the engine of the automobile is started, creating a vacuum in the system, suction will travel from the intake manifold through the pipe 75 and enter the chamber 116 of the locking device 112 which lifts the flexible diaphragm 115 upwardly, raising the cam 122, which rocks the arm 124, unlocking the lock on the power brake shaft 29. (See Figures 5 and 6.) The brakes of the vehicle, however, remain on, so long as the steering wheel 10 is not grasped, since the vacuum in the system created by starting the engine raises the flexible diaphragm 62 in the vacuum head 60 of the main control valve 35 through the vacuum created in the chamber 61 by means of suction in the intake manifold. The vacuum acts on said diaphragm through the pipe line 75 which enters the vacuum head 60 through the opening 63. This seats valve 68 against the passage 59. The relation of parts in the main control valve, when the engine is started and before the steering wheel is grasped, is shown in Figures 2 and 3.

After the motor is started and the driver wishes the vehicle to proceed, he grasps the steering wheel 10 which closes the switch therein. The closing of the switch energizes the solenoid coil 41 in the main control valve 35, the electrical current flowing from the battery 42 through the lead 44, lead 43, solenoid coil 41, leads 45 and 36, switch 37, lead 38, the switch in the steering wheel 10, thence to the ground 10a. The energizing of the solenoid coil 41 in the main control valve 35 causes the armature 71 to move downwardly, seating the valve 74 against the passage 56 and unseating the valve 73 from said passage, which allows air to be drawn through the cleaner 54, opening 53, recess 52, passage 56, opening 57 and pipe line 40, into the power cylinder 30. This releases the suction on the diaphragm in the power cylinder 30 which, in turn, will release the brakes of the vehicle through the movement of the power brake shaft 29 to the right which, in turn, moves the connecting rod 25 to the right, which operates the piston in the master hydraulic cylinder 21 so as to release the brakes through the clevis 18, arm 19, and piston rod 20. The vacuum created in the system through the starting of the engine seats the valve 68 against the passage 59 closing the same. The brakes on the vehicle are now in a released position.

If the vehicle is loaded, the vacuum intensity control valve 103 is set to allow a maximum amount of vacuum to pass through the same, the setting being made by means of the control lever 105, which is connected to the valve 103 by means of the flexible connection 107. Should the vehicle be empty, the intensity control valve is likewise set so that a minimum amount of vacuum will pass therethrough.

When the vehicle is being operated at or below a speed at which the governor 85 is set, the solenoid coil 82 of the secondary control valve 81 is energized by the flow of current from the battery 42 through the lead 44 through the switch 134 which is closed, leads 136 and 137, switch 83, lead 84 which is connected to one end of the said solenoid coil, the other end of this coil being connected to the governor 85 through the lead 86, said governor being grounded through the lead 87. The energizing of the coil 82 will move the armature therein downwardly setting the valve 100 against the opening of the passage 94, closing the same and unseating the valve 101 from said passage, opening this passage to the recess 93 and the opening therein 97 which is connected to the pipe line 110, leading from the vacuum intensity control valve 109 which is set at a predetermined fixed position, so that it will admit the proper amount of vacuum into the secondary control valve 81 for setting the brakes at the speed to which the governor 85 is set or a lower speed in order that the brakes on the vehicle will not be applied too forcefully.

For sake of example, we shall presume that the contact in the governor 85 is set so that the same will be broken at or above 18 miles per hour. When the car is operated above the speed of 18 miles an hour, therefore, the contact in the governor 85 is broken, which will de-energize the solenoid coil 82 in the secondary control valve 81, since the lead 86 will no longer be connected to the ground. When the solenoid coil 82 is de-energized, the secondary control valve 81 assumes the position shown in Figure 4, that is, the valve 100 is unseated from the opening to the passage 94 and the valve 101 is seated against the opposite opening to the passage 94, closing the communication between said passage and the recess 93. Suction from the motor, therefore, may pass through the vacuum intensity control valve 103, pipe line 104, and into the secondary control valve 81 into another opening 91, passage 92, and thence into the chamber 90. From the chamber 90 the vacuum may pass through the passage 94 into the opening 95 and thence through the pipe 102 to the main control valve.

If the driver relaxes his grasp from the steering wheel through an emergency or for any other reason, the contacts in said switch of the steering wheel 10 are broken and electrical current cannot flow from the battery 42 through the leads 44 and 43, solenoid coil 41, leads 45, 46, switch 37 and lead 38, since the connection to the ground 10a is broken. The solenoid coil 41, therefore, is de-energized and the valves 73 and 74 return to the position shown in Figures 2 and 3. The opening 57 is closed to the atmosphere by the valve 73 seating against the opening to the passage 56, closing the same to the recess 52 and opening 53. Suction enters the chamber 49 through the pipe 102, and since the valve 74 is unseated from the passage 56, the suction passes into this passage and into the opening 57, thence to the pipe 40 and into the power cylinder 30, causing the diaphragm thereon to move the shaft 29 to the left which, in turn, moves the connecting rod 25, arm 22, clevis 18 to the left, pivoting the arm 19 at 19a, which forces the piston rod 20 of the master cylinder inwardly applying the brakes of the vehicle.

The intensity of the vacuum entering the power cylinder 30 and with which the brakes are applied is governed by the secondary control valve 81 and the vacuum intensity control valves 109 and 103.

When the vehicle is being operated at a speed in excess of the speed at which the electrical governor 85 is set, for example, eighteen miles per hour, the contacts in the governor 85 are broken disconnecting the lead 80 from the lead 87 which is connected to the ground. Electrical current, therefore, will cease to flow from the battery 42, through the lead 44, ignition cut-out switch 134, leads 136 and 137, switch 83, lead 84, and solenoid coil 82 and lead 86, since the connection to the ground is broken. The solenoid coil 82, therefore, is de-energized, the valves 100 and 101 in the secondary control valve assuming the position shown in Figure 4 of the drawings, that is, the valve 101 is seated against one end of the passage 94, closing the same to the recess 93 and opening 97 to which is attached the pipe 110. The valve 100 is unseated from the other end of the passage 94, opening the chamber 90 thereto and to the opening 95 to which it attached the pipe line 102, which leads to the opening 51 in the main control valve 35.

When the grasp of the operator is released from the steering wheel 10 and the vehicle is being operated at more than eighteen miles per hour, suction passes from the intake manifold of the engine through the pipe 76, valve 80, check valve 79, pipe line 76, the vacuum intensity valve 103 controlled from the driver's compartment, to admit the desired vacuum into the remainder of the system, through the line 104 into the opening 91 of the secondary control valve 81. The suction then passes through the passage 92 into chamber 90 of said secondary control valve; thence through the passage 94, the opening 95 into the line 102 and enters the main control valve 35 through the opening 51.

Since the solenoid coil 41 has been de-energized by the release of the driver's grasp on the steering wheel 10, as previously described, the suction passes through the chamber 49 into the passage 56 and thence into the power cylinder 30, applying the brakes of the vehicle at the intensity to which the valve 103 is set.

When the vehicle is being operated at eighteen miles per hour or under, the solenoid coil 82 in the valve 81 is energized by the flow of the electrical current from the battery 42, through the lead 44, switch 134, leads 136 and 137, switch 83, lead 84, solenoid coil 82, and thence to the ground through the lead 86, governor 85, and lead 87. Energizing of the coil 82 seats the valve 100 by movement of the armature therein against the opening to the passage 94, closing communication between said passage and the chamber 90. This will unseat the valve 101 from the opposite opening of the passage 94, opening communication between said passage and the recess 93.

Therefore, when the car is being operated at, for example, eighteen miles per hour or less and the driver's grasp is released from the steering wheel 10, de-energizing the solenoid coil 41 in the valve 35, suction will pass from the intake manifold of the engine through the pipe 76, valve 80, check valve 79, pipe 76, pipe 111, intensity control valve 109, which is set at a fixed position to admit the vacuum of the proper intensity for applying brakes at the lower speeds; thence through pipe 110 into opening 97 of the secondary control valve 81 into the recess 93 therein and into the passage 94, thence out through the opening 95 into pipe 102 and into the main control valve 35 through the opening 51. From the opening 51 the suction passes through the chamber 49, passage 56 and into the pipe 40 through the opening 57 and into the power cylinder 30, applying the brakes by movement of the shaft 39 to the left.

Movement of the shaft 29 to the left moves the arm 140 to the left, the tension of the spring 141 pulling the lever 139 to the left as the arm 140 moves in that direction until the lever 139 engages the stop 148, at which time the lever 139, using the stop 148 as a pivot point moves the rod 134a to the right, breaking the contact in the switch 134 which breaks the connection between the lead 83a to the ignition of the vehicle and the battery 42 through the switch 83, leads 137 and 136, switch 134 and lead 44.

As soon as the motor is stopped, the brakes being applied through the automatic system, there is no longer a vacuum in the line 75, since suction from the intake manifold of the engine stops with the engine. The diaphragm in the locking device 112 will drop which will disengage the cam 122 from the arm 124, the arm 124 pivoting forward on the fulcrum pin 125, wedging the diagonally opposite edges of the hole 126 against the shaft 29, locking the same against movement to the right which locks the brakes in an applied position.

Loss of suction in the pipe 75 through stopping of the engine also allows the diaphragm 62 in the main control valve 35 to drop, unseating the valve 68 from the passage 59. Vacuum will then flow from the auxiliary reservoir 77 through the pipe 76 into the opening 50 in the main control valve 35, thence through the passage 59 into the chamber 65 and from the chamber 65 into the passages 70 and 69 into the opening 51, thence into the chamber 49 through the passage 56 and into the pipe 40 through the opening 57 holding the diaphragm in the brake cylinder, so that the brakes are held in an applied position by the maximum vacuum in the automatic system, regardless of the settings on the vacuum intensity valves 103 and 109, since vacuum will pass to the power cylinder 30 from the auxiliary reservoir 77 through the pipes 78 and 76, passing around the vacuum intensity valves.

If it is desired to stop the vehicle and not cut off the motor, for example, in making a conscious, as distinguished from a stop made by means of the operator losing consciousness, the clutch is depressed, moving the crank 144 to the left. The flexible connection 146 also moves to the left allowing the arm 142 to move to the left with the lever 139 as the brakes are being applied, thereby keeping the switch 134 in contact and the motor of the vehicle running.

If it is desirable to not have the ignition circuit broken through the use of the automatic braking system, for example, during city driving, switch 134 may be rendered inoperative by closing switch 135 which will connect lead 83a to the battery 42 through the switch 83, leads 137, 136, switch 135 and lead 138.

When the foot brake is used in the conventional manner, the extension 12 is rocked to the left which, through the contacting of the pin 16 against the end of the slot 17, moves the clevis 18 to the left which, in turn, pivots the arm 19 on the pivot 19a, moving the piston rod 20 inwardly in the master hydraulic cylinder 21, applying the brakes of the vehicle. The movement of the extension 12 to the left will, at the same time, move the connecting rod 33 to the left, moving the arm 31 of the switch 32, so that a contact between the leads 36 and 34 are made. In this manner, the automatic system does not operate, since the solenoid coil 41 of the main control valve 35 remains energized, the relaxing of the operator's grasp on the steering wheel 10 not affecting the same, since current will pass from the battery 42, lead 44, lead 43 through the solenoid coil 41, lead 45, lead 36, switch 32 and through lead 34 to the ground.

Movement of the extension 12 and clevis 18 to the left will also, at the same time, rock the arm 22 to the left, moving the rod 25 and shaft 29 to the left. Since the solenoid coil 41 in the main control valve 35 is energized, the power cylinder 30 is open to the atmosphere through the pipe 40, opening 57, in the main control valve 35, passage 56, recess 52, opening 53, and through the air cleaner 54, which allows free movement of the shaft 29 to the left.

The contact in the ignition cut-out switch 134 is not broken by movement to the left of the shaft 29 and the arm 140 which is attached to said shaft, when the brakes are applied by foot in the conventional manner, since movement of the rod 33 to the left allows slack in the flexible connection 147, which permits movement of the arm 142 to the left, permitting the lever 139 to move to the left also through the tension of the spring 141, so that the same will not pivot at the pivot point 142a to break the contact in the switch 134. The vehicle engine, therefore, will remain running when the brakes are applied by the operator's foot in the conventional manner.

In the event the automatic system for any reason should fail, or it is desirable to operate the vehicle in the conventional manner, the valve 80 may be turned to its closed position, stopping any suction from the intake manifold from entering the system. The switch 37 is opened which disconnects the switch in the steering wheel 10 by breaking the connection between the lead 38 and lead 36, and the pet-cock 77a is opened, releasing the vacuum in the system through the auxiliary reservoir 77.

It is apparent that the specific illustrations given above have been given by way of illustration and not by way of limitation, and that the structures above described are subject to wide variation and modification without departing from the scope or intent of the invention, all of which variations and modifications are to be included within the scope of the present invention.

I claim:

1. In combination with a motor vehicle of the type having a motor, a steering wheel, a source of electrical energy, a source of pressure substantially different from atmospheric, a series of brakes, and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated and a second connection in said conduit system leading from said source to said first-mentioned control valve to admit a maximum pressure from said source when the vehicle is at rest.

2. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, a second connection in said conduit system leading from said source to said first-mentioned control valve to admit a maximum pressure from said source when the vehicle is at ratest, and means to prevent movement of said actuating connection when said motor stops.

3. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, a second connection in said conduit system leading from said source to said first-mentioned control valve to admit a maximum pressure from said source when the vehicle is at rest, and means to prevent movement of said actuating connection when said source of pressure substantially different from atmospheric is stopped.

4. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves provided with electro-magnetic operating means, on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated and a second connection in said conduit system leading from said source to said first mentioned control valve to admit a maximum pressure from said source when the vehicle is at rest.

5. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being provided with electro-magnetic operating means adapted to be de-energized so as to admit pressure substantially less than atmospheric to said fluid pressure operated means from said source when said vehicle brakes are applied by means of said automatic brake operating means, a second of said control valves being provided with electro-magnetic operating means adapted to be energized when the vehicle is operated at or below a pre-determined low rate of speed, and admit a pre-determined low pressure less than atmospheric to said first-mentioned control valve when said automatic brake operating means is operated, and a second connection in said conduit system leading from said source to said first-mentioned control valve to admit a maximum pressure from said source when the vehicle is at rest.

6. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being provided with electro-magnetic operating means adapted to be de-energized so as to admit pressure substantially less than atmospheric to said fluid pressure operated means from said source when said vehicle brakes are applied by means of said automatic brake operating means, a second of said control valves being provided with electro-magnetic operating means, means to de-energize said electro-magnetic operating means when the vehicle is operated above a pre-determined low rate of speed, and admit a pre-determined substantially high pressure less than atmospheric to said first-mentioned control valve when said automatic brake operating means is operated, and a second connection in said conduit system leading from said source to said first-mentioned control valve to admit a maximum pressure from said source when the vehicle is at rest.

7. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections consisting of parallel pipe lines, intensity governing valves in said pipe lines to regulate the intensity of said pressure less than atmospheric transmitted therethrough, one of said governing valves being set at a predetermined position to pass a substantially low pressure less than atmospheric and another of said governing valves being manually set to pass a substantially high pressure less than atmospheric, control valves on said one of said connections, one of said control valves being provided with electro-magnetic operating means adapted to be de-energized so as to admit pressure substantially less than atmospheric to said fluid pressure operated means from said source when said vehicle brakes are applied by means of said automatic brake operating means, a second of said control valves being provided with electro-magnetic operating means to be energized when the vehicle is operated at or below a pre-determined low rate of speed, and admit a pre-determined low pressure less than atmospheric to said first-mentioned control valve through said parallel pipe line governed by said governing valve set to pass a low pressure when said automatic brake operating means is operated, and a second connection in said conduit system leading from said source to said first-mentioned control valve to admit a maximum pressure from said source when the vehicle is at rest.

8. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections consisting of parallel pipe lines, intensity governing valves in said pipe lines to regulate the intensity of said pressure less than atmospheric transmitted therethrough, one of said governing valves being set at a pre-determined position to pass a substantially low pressure less than atmospheric and another of said governing valves being manually set to pass a substantially high pressure less than atmospheric, control valves on said one of said connections, one of said control valves being provided with electro-magnetic operating means adapted to be de-energized so as to admit pressure substantially less than atmospheric to said fluid pressure operated means from said source when said vehicle brakes are applied by means of said automatic brake operating means, a second of said control valves being provided with electro-magnetic operating means, means to de-energize said electro-magnetic operating means when the vehicle is operated above a pre-determined low rate of speed and admit a pre-determined substantially high pressure less than atmospheric to said first-mentioned control valve through said parallel pipe line governed by said governing valve manually set to pass a high pressure when said automatic brake operating means is operated, and a second connection in said conduit system leading from said source to said first-mentioned control valve to admit a maximum pressure from said source when the vehicle is at rest.

9. In combination with a motor vehicle of the type having a motor, an ignition circuit to said motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid operated means to said brake operating means, a conduit system having connections leading from said source of pressure different from atmospheric to said fluid operated means, one of said connections being obstructed so as to vary the pressure different from atmospheric transmitted therethrough, and control valves provided with electro-magnetic operating means, on said one of said connections, one of said control valves being normally released to the atmosphere and adapted to admit said pressure less than atmospheric to said fluid pressure operated means upon operation of said automatically actuated brake operating means, a second of said control valves adapted to admit a predetermined pressure less than atmospheric to said first mentioned control valve in accordance with the speed at which the vehicle is operated when said automatic brake operating means is operated, means operable by said actuating connection to disconnect the ignition circuit of said motor when said automatic brake operating means is operated and a second connection in said conduit system leading from said source to said first-mentioned control valve to admit a maximum pressure from said source when the vehicle is at rest.

10. In combination with a motor vehicle of the type having a motor, an ignition circuit to said motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid operated means to said brake operating means, a conduit system having connections leading from said source of pressure different from atmospheric to said fluid operated means, one of said connections being obstructed so as to vary the pressure different from atmospheric transmitted therethrough, and control valves provided with electro-magnetic operating means, on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, means operable by said actuating connection to disconnect the ignition circuit of said motor when said automatic brake operating means is operated, means to render said ignition disconnecting means inoperative when clutch operated means is operated and a second connection in said conduit system leading from said source to said first-mentioned control valve to admit a maximum pressure from said source when the vehicle is at rest.

11. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, a second connection in said conduit system leading from said source to said first-mentioned control valve to admit a maximum pressure from said source when the vehicle is at rest, and means connected to said brake operating means to render said automatic brake operator inoperative upon actuation of the brake operating means.

12. In combination with a motor vehicle of the type having a motor, a steering wheel, a source of electrical energy, a source of pressure substantially different from atmospheric, a series of brakes, and brake operating means, including a hydraulic cylinder, to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, said actuating means extending to and operating said hydraulic system, a conduit system having connections leading from said source of pressure different from atmospheric to said fluid operated means, one of said connections being obstructed so as to vary the pressure different from atmospheric transmitted therethrough and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated and a second connection in said conduit system leading from said source to said first-mentioned control valve to admit a maximum pressure from said source when the vehicle is at rest.

13. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, a second connection in said conduit system leading from said source to said first-mentioned control valve to admit a maximum pressure from said source when the vehicle is at rest, a locking device adapted to act upon said actuating connection comprising a casing having a diaphragm chamber, a diaphragm in said chamber, a port admitting said pressure substantially less than atmospheric to one side of said diaphragm, a latch means with a hole intermediate its length extending around said brake actuating connection, one end of said latch means being pivoted, the opposite end having an offset surface, a cam connected to said diaphragm to act upon said offset portion and hold the diagonally opposite edges of said hole from engaging said actuating connection when pressure substantially less than atmospheric is exerted on said diaphragm, and to disengage said offset portion when said pressure is stopped permitting the diagonally opposite edges of said hole to engage and lock said brake actuating connection against movement.

14. In combination with a motor vehicle of the type having a motor, a steering wheel, a source of electrical energy, a source of pressure substantially different from atmospheric, a series of brakes and brake operating means to operate said brakes, a clutch and clutch operating means to operate said clutch; the combination therewith of a device for automatically actuating said brake operating means upon release of the steering wheel by the operator of the vehicle comprising fluid pressure operating means, an actuating means from said fluid pressure operated means to said brake operating means, a conduit system having connections leading from said source of pressure different from atmospheric to said fluid operated means, one of said connections being obstructed so as to vary the pressure different from atmospheric transmitted therethrough, and control valves on said one of said connections, one of said control valves being normally released to the atmosphere and adapted to admit said pressure less than atmospheric to said fluid pressure operated means upon operation of said automatically actuated brake operating means, a second of said control valves adapted to admit a pre-determined pressure less than atmospheric to said first-mentioned control valve in accordance with the speed at which the vehicle is operated when said automatic brake operating means is operated, a second connection in said conduit system leading from said source to said first-mentioned control valve to admit a maximum pressure from said source when the vehicle is at rest, a locking device adapted to act upon said actuating connection comprising a casing having a diaphragm chamber, a diaphragm in said chamber, a port admitting said pressure substantially less than atmospheric to one side of said diaphragm, a latch means with a hole intermediate its length extending around said actuating connection, one end of said latch means being pivoted, the opposite end having an offset surface, a cam connected to said diaphragm to act upon said offset portion and hold the diagonally opposite edges of said hole from engaging said brake actuating connection when pressure substantially less than atmospheric is exerted on said diaphragm, and to disengage said offset portion when said pressure is stopped permitting the diagonally opposite edges of said hole to engage and lock said brake actuating connection against movement, and unlocking means mounted on said casing to unlock said latch from said actuating connection independently of the pressure less than atmospheric.

WARREN I. WEEKS.